(No Model.)
T. M. RICHARDSON.
THILL COUPLING.
No. 467,052. Patented Jan. 12, 1892.
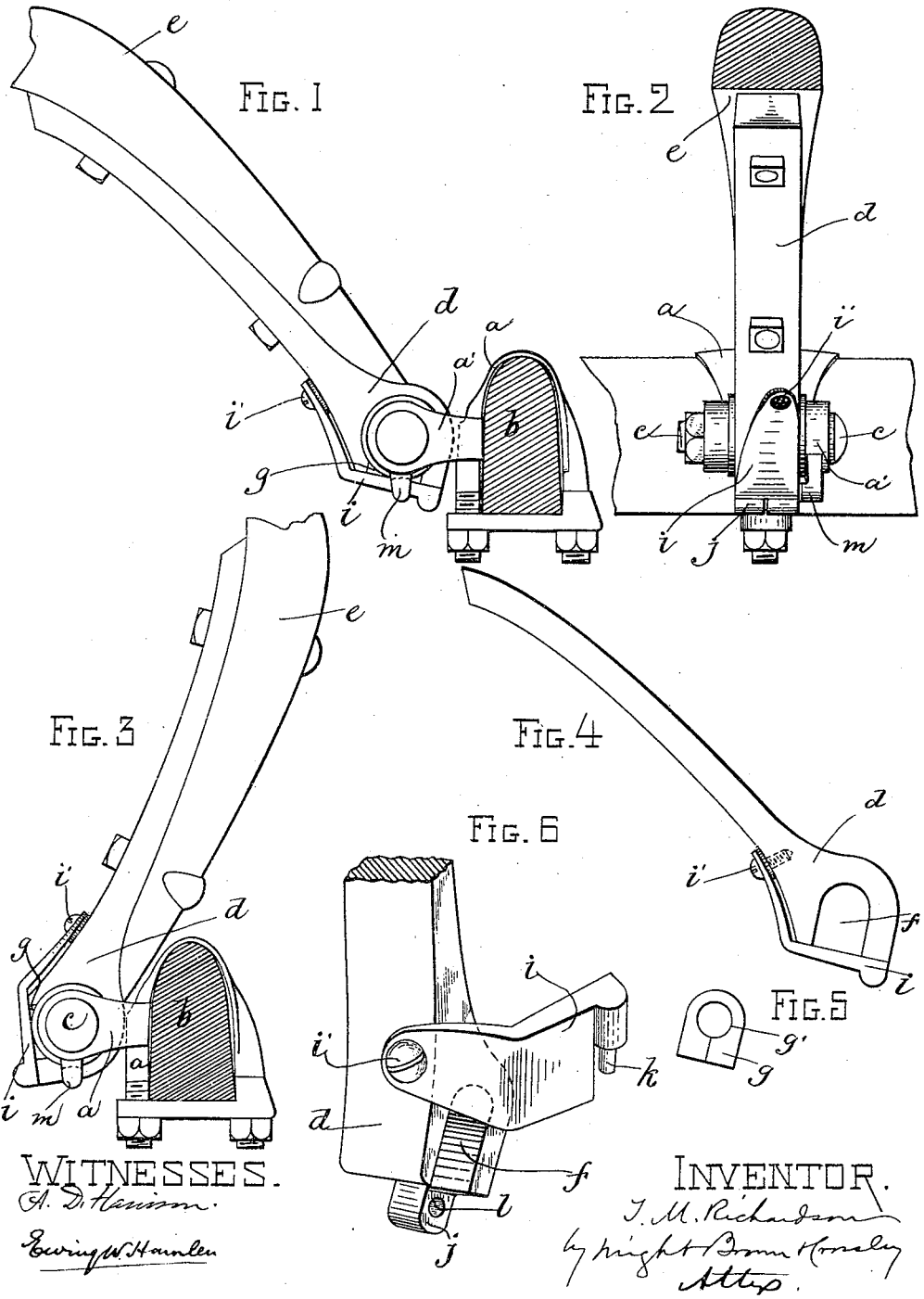

UNITED STATES PATENT OFFICE.

THEODORE M. RICHARDSON, OF STOCKTON SPRINGS, ASSIGNOR TO LEVI CLAY AND FRED G. WHITE, OF BELFAST, MAINE.

THILL-COUPLING.

SPECIFICATION forming part of Letters Patent No. 467,052, dated January 12, 1892.

Application filed May 2, 1891. Serial No. 391,376. (No model.)

*To all whom it may concern:*

Be it known that I, THEODORE M. RICHARDSON, of Stockton Springs, in the county of Waldo and State of Maine, have invented certain new and useful Improvements in Thill-Couplings, of which the following is a specification.

Of the accompanying drawings, forming a part of this specification, Figure 1 represents a side view of my improved coupling, the axle being shown in section. Fig. 2 represents a front view of the same. Fig. 3 represents a side view showing the thill raised to permit the members of the coupling to be separated. Fig. 4 represents a side view of one member of the coupling detached. Fig. 5 represents the bushing that is inserted in the socket in the member shown in Fig. 4. Fig. 6 represents a perspective view of the member shown in Fig. 4, the latch being displaced to permit the separation of said member from the other member.

The same letters of reference indicate the same parts in all of the figures.

In the drawings, $a$ represents the clip that surrounds the axle $b$, and has on its front side the ears $a'$ $a'$, which receive the bolt $c$, that connects the movable member of the coupling with the fixed member, the latter being the clip $a$ and ears $a'$ $a'$.

$d$ represents the movable member attached to a thill $e$ or to a pole in a double rig. The member $d$ has an open socket $f$, which is of sufficient size to receive a bushing $g$, Fig. 5, of leather or other suitable material, said bushing being formed with a bearing $g'$ to receive the bolt $c$.

$i$ represents a latch pivoted at $i'$ to the member $d$ and adapted to extend across the mouth of the socket $f$, as shown in Figs. 1, 2, 3, and 4, and thus close said socket, or to be swung away from the socket, as shown in Fig. 6, thus opening the socket. When the latch closes the socket, its swinging end bears on a shoulder $j$ on the member $d$, said end being preferably provided with a stud $k$, adapted to enter a socket $l$ in the shoulder.

$m$ represents a finger or stop affixed to one of the ears $a'$ and projecting forward in such position that when the thill is in any position it can occupy, excepting its extreme highest position, (shown in Fig. 3,) the said finger will stand beside the swinging end of the latch $i$ and prevent said latch from swinging outwardly to uncover the socket $f$. When the thill is raised to the highest position it can occupy, as shown in Fig. 3, the latch $i$ is removed from the stop or finger $m$, so that it can be swung aside to uncover the socket. It will be seen, therefore, that when it is desired to disconnect the members of the coupling the thills must first be raised above the positions they occupy when in use and when resting on the floor, in order that the latch may be swung away from the socket, the latch being retained in its socket-closing position by the finger $m$ when the thills are attached to the horse and when they are resting on the floor. When the thills are raised higher than they possibly can be when attached to the horse, the latch can be swung aside, and then the movable member of the coupling can be raised from the connecting-bolt, and detached from the fixed member.

From the foregoing it will be seen that the removal of the thill may be effected by simply swinging them upwardly above their operative position, then displacing the latch $i$, and then raising the movable coupling member from the connecting-bolt, the removal being effected without removing the connecting-bolt.

The bushing $g$ is a piece of leather or other flexible material cut or hollowed out on one side and bent to the form shown in Fig. 5, the hollowed side being thus caused to form a circular bearing.

I claim—

The combination of the fixed coupling member having the connecting-bolt, the fixed arm or stop, and the movable coupling member having the open socket and the swinging latch adapted to cover said socket, the arrangement of said parts being substantially as shown and described, whereby when the said movable member is in its operative position or depressed below the same the latch is held by the fixed stop and when the movable member is raised above its operative position said latch is released.

In testimony whereof I have signed my name to this specification, in the presence of two subscribing witnesses, this 9th day of April, A. D. 1891.

THEODORE M. RICHARDSON.

Witnesses:
 GEO. E. JOHNSON,
 B. B. EMERY.